(12) United States Patent
Wyatt et al.

(10) Patent No.: US 9,075,559 B2
(45) Date of Patent: Jul. 7, 2015

(54) MULTIPLE GRAPHICS PROCESSING UNIT SYSTEM AND METHOD

(75) Inventors: David Wyatt, San Jose, CA (US); Manish Modi, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1115 days.

(21) Appl. No.: 12/395,562

(22) Filed: Feb. 27, 2009

(65) Prior Publication Data
US 2010/0220102 A1   Sep. 2, 2010

(51) Int. Cl.
G06F 15/16 (2006.01)
G09G 3/36 (2006.01)
G06F 3/14 (2006.01)

(52) U.S. Cl.
CPC .................... *G06F 3/1438* (2013.01)

(58) Field of Classification Search
USPC .......................................... 345/502
See application file for complete search history.

(56) References Cited

U.S. PATENT DOCUMENTS

| | | |
|---|---|---|
| 4,145,685 A | 3/1979 | Farina |
| 4,603,400 A | 7/1986 | Daniels |
| 4,955,066 A | 9/1990 | Notenboom |
| 5,016,001 A | 5/1991 | Minagawa et al. |
| 5,321,419 A | 6/1994 | Katakura et al. |
| 5,321,510 A | 6/1994 | Childers et al. |
| 5,321,811 A | 6/1994 | Kato et al. |
| 5,371,847 A | 12/1994 | Hargrove |
| 5,461,679 A | 10/1995 | Normile et al. |
| 5,517,612 A | 5/1996 | Dwin et al. |
| 5,552,802 A | 9/1996 | Nonoshita et al. |
| 5,687,334 A | 11/1997 | Davis et al. |
| 5,712,995 A | 1/1998 | Cohn |
| 5,768,164 A | 6/1998 | Hollon, Jr. |
| 5,781,199 A | 7/1998 | Oniki et al. |
| 5,841,435 A | 11/1998 | Dauerer et al. |
| 5,878,264 A | 3/1999 | Ebrahim |
| 5,900,913 A | 5/1999 | Tults |
| 5,917,502 A | 6/1999 | Kirkland et al. |
| 5,923,307 A | 7/1999 | Hogle, IV |
| 5,963,200 A | 10/1999 | Deering et al. |

(Continued)

FOREIGN PATENT DOCUMENTS

WO    2005026918    3/2005

OTHER PUBLICATIONS

Tala internet materials, 2006 (http://web.archive.org/web/20061117065745/http://www.asic-world.com/digital/combo4.html).*

(Continued)

*Primary Examiner* — Xiao Wu
*Assistant Examiner* — Yingchun He

(57) ABSTRACT

Systems and methods for utilizing multiple graphics processing units for controlling presentations on a display are presented. In one embodiment, a dual graphics processing system includes a first graphics processing unit for processing graphics information; a second graphics processing unit for processing graphics information; and a component for controlling switching between said first graphics processing unit and said second graphics processing unit. In one embodiment, the component for controlling complies with appropriate panel power sequencing operations when coordinating the switching between the first graphics processing unit and the second graphics processing unit.

17 Claims, 10 Drawing Sheets

(56) References Cited

U.S. PATENT DOCUMENTS

| | | | |
|---|---|---|---|
| 5,978,042 A | 11/1999 | Vaske et al. |
| 6,002,411 A | 12/1999 | Dye |
| 6,008,809 A | 12/1999 | Brooks |
| 6,018,340 A | 1/2000 | Butler et al. |
| 6,025,853 A | 2/2000 | Baldwin |
| 6,075,531 A | 6/2000 | DeStefano |
| 6,078,339 A | 6/2000 | Meinerth et al. |
| 6,118,462 A | 9/2000 | Margulis |
| 6,175,373 B1 | 1/2001 | Johnson |
| 6,191,758 B1 | 2/2001 | Lee |
| 6,208,273 B1 | 3/2001 | Dye et al. |
| 6,226,237 B1 | 5/2001 | Chan et al. |
| 6,259,460 B1 | 7/2001 | Gossett et al. |
| 6,337,747 B1 | 1/2002 | Rosenthal |
| 6,359,624 B1 | 3/2002 | Kunimatsu |
| 6,388,671 B1 | 5/2002 | Yoshizawa et al. |
| 6,449,017 B1 | 9/2002 | Chen |
| 6,473,086 B1 | 10/2002 | Morein et al. |
| 6,480,198 B2 | 11/2002 | Kang |
| 6,483,502 B2 | 11/2002 | Fujiwara |
| 6,498,721 B1 | 12/2002 | Kim |
| 6,557,065 B1 | 4/2003 | Peleg et al. |
| 6,600,500 B1 | 7/2003 | Yamamoto |
| 6,606,127 B1 | 8/2003 | Fang et al. |
| 6,628,243 B1 | 9/2003 | Lyons et al. |
| 6,630,943 B1 | 10/2003 | Nason et al. |
| 6,654,826 B1 | 11/2003 | Cho et al. |
| 6,657,632 B2 | 12/2003 | Emmot et al. |
| 6,724,403 B1 | 4/2004 | Santoro et al. |
| 6,753,878 B1 | 6/2004 | Heirich et al. |
| 6,774,912 B1 | 8/2004 | Ahmed et al. |
| 6,784,855 B2 | 8/2004 | Matthews et al. |
| 6,816,977 B2 | 11/2004 | Brakmo et al. |
| 6,832,269 B2 | 12/2004 | Huang et al. |
| 6,832,355 B1 | 12/2004 | Duperrouzel et al. |
| 6,956,542 B2 | 10/2005 | Okuley et al. |
| 7,007,070 B1 | 2/2006 | Hickman |
| 7,010,755 B2 | 3/2006 | Anderson et al. |
| 7,030,837 B1 | 4/2006 | Vong et al. |
| 7,034,776 B1 | 4/2006 | Love |
| 7,119,808 B2 | 10/2006 | Gonzalez et al. |
| 7,124,360 B1 | 10/2006 | Drenttel et al. |
| 7,129,909 B1 | 10/2006 | Dong et al. |
| 7,212,174 B2 | 5/2007 | Johnston e |
| 7,269,797 B1 | 9/2007 | Bertocci et al. |
| 7,359,998 B2 | 4/2008 | Chan et al. |
| 7,383,412 B1 | 6/2008 | Diard |
| 7,450,084 B2 | 11/2008 | Fuller et al. |
| 7,486,279 B2 | 2/2009 | Wong et al. |
| 7,509,444 B2 | 3/2009 | Chiu et al. |
| 7,522,167 B1 | 4/2009 | Diard et al. |
| 7,552,391 B2 | 6/2009 | Evans et al. |
| 7,558,884 B2 | 7/2009 | Fuller et al. |
| 7,612,783 B2 | 11/2009 | Koduri et al. |
| 8,176,155 B2 | 5/2012 | Yang et al. |
| 8,766,989 B2 | 7/2014 | Wyatt et al. |
| 2001/0028366 A1 | 10/2001 | Ohki et al. |
| 2002/0087225 A1 | 7/2002 | Howard |
| 2002/0128288 A1 | 9/2002 | Kyle et al. |
| 2002/0129288 A1 | 9/2002 | Loh et al. |
| 2002/0140627 A1 | 10/2002 | Ohki et al. |
| 2002/0163513 A1 | 11/2002 | Tsuji |
| 2002/0182980 A1 | 12/2002 | Van Rompay |
| 2002/0186257 A1 | 12/2002 | Cadiz et al. |
| 2003/0016205 A1 | 1/2003 | Kawabata et al. |
| 2003/0025689 A1 | 2/2003 | Kim |
| 2003/0041206 A1 | 2/2003 | Dickie |
| 2003/0065934 A1 | 4/2003 | Angelo et al. |
| 2003/0084181 A1 | 5/2003 | Wilt |
| 2003/0088800 A1 | 5/2003 | Cai |
| 2003/0090508 A1 | 5/2003 | Keohane et al. |
| 2003/0122836 A1 | 7/2003 | Doyle et al. |
| 2003/0126335 A1 | 7/2003 | Silvester |
| 2003/0188144 A1 | 10/2003 | Du et al. |
| 2003/0189597 A1 | 10/2003 | Anderson et al. |
| 2003/0195950 A1 | 10/2003 | Huang et al. |
| 2003/0197739 A1 | 10/2003 | Bauer |
| 2003/0200435 A1 | 10/2003 | England et al. |
| 2003/0222876 A1 | 12/2003 | Giemborek et al. |
| 2004/0001069 A1 | 1/2004 | Snyder et al. |
| 2004/0019724 A1 | 1/2004 | Singleton, Jr. et al. |
| 2004/0027315 A1 | 2/2004 | Senda et al. |
| 2004/0080482 A1 | 4/2004 | Magendanz et al. |
| 2004/0085328 A1 | 5/2004 | Maruyama et al. |
| 2004/0184523 A1 | 9/2004 | Dawson et al. |
| 2004/0222978 A1 | 11/2004 | Bear et al. |
| 2004/0224638 A1 | 11/2004 | Fadell et al. |
| 2004/0225901 A1 | 11/2004 | Bear et al. |
| 2004/0225907 A1 | 11/2004 | Jain et al. |
| 2004/0235532 A1 | 11/2004 | Matthews et al. |
| 2004/0268004 A1 | 12/2004 | Oakley |
| 2005/0012749 A1 | 1/2005 | Gonzalez et al. |
| 2005/0025071 A1 | 2/2005 | Miyake et al. |
| 2005/0052446 A1 | 3/2005 | Plut |
| 2005/0059346 A1 | 3/2005 | Gupta et al. |
| 2005/0064911 A1 | 3/2005 | Chen et al. |
| 2005/0066209 A1 | 3/2005 | Kee et al. |
| 2005/0073515 A1 | 4/2005 | Kee et al. |
| 2005/0076088 A1 | 4/2005 | Kee et al. |
| 2005/0076256 A1 | 4/2005 | Fleck et al. |
| 2005/0097506 A1 | 5/2005 | Heumesser |
| 2005/0140566 A1 | 6/2005 | Kim et al. |
| 2005/0182980 A1 | 8/2005 | Sutardja |
| 2005/0240538 A1 | 10/2005 | Ranganathan |
| 2005/0262302 A1 | 11/2005 | Fuller et al. |
| 2006/0001595 A1 | 1/2006 | Aoki |
| 2006/0007051 A1 | 1/2006 | Bear et al. |
| 2006/0010261 A1 | 1/2006 | Bonola et al. |
| 2006/0085760 A1 | 4/2006 | Anderson et al. |
| 2006/0095617 A1 | 5/2006 | Hung |
| 2006/0119537 A1 | 6/2006 | Vong et al. |
| 2006/0119538 A1 | 6/2006 | Vong et al. |
| 2006/0119602 A1 | 6/2006 | Fisher et al. |
| 2006/0125784 A1 | 6/2006 | Jang et al. |
| 2006/0129855 A1 | 6/2006 | Rhoten et al. |
| 2006/0130075 A1 | 6/2006 | Rhoten et al. |
| 2006/0150230 A1 | 7/2006 | Chung et al. |
| 2006/0164324 A1 | 7/2006 | Polivy et al. |
| 2006/0200751 A1 | 9/2006 | Underwood et al. |
| 2006/0232494 A1 | 10/2006 | Lund et al. |
| 2006/0250320 A1 | 11/2006 | Fuller et al. |
| 2006/0267857 A1 | 11/2006 | Zhang et al. |
| 2006/0267987 A1 | 11/2006 | Litchmanov |
| 2006/0267992 A1 | 11/2006 | Kelley et al. |
| 2006/0282855 A1 | 12/2006 | Margulis |
| 2007/0046562 A1 | 3/2007 | Polivy et al. |
| 2007/0052615 A1 | 3/2007 | Van Dongen et al. |
| 2007/0067655 A1 | 3/2007 | Shuster |
| 2007/0079030 A1 | 4/2007 | Okuley et al. |
| 2007/0083785 A1 | 4/2007 | Sutardja |
| 2007/0091098 A1 | 4/2007 | Zhang et al. |
| 2007/0103383 A1 | 5/2007 | Sposato et al. |
| 2007/0129990 A1 | 6/2007 | Tzruya et al. |
| 2007/0153007 A1 | 7/2007 | Booth et al. |
| 2007/0195007 A1 | 8/2007 | Bear et al. |
| 2007/0273699 A1 | 11/2007 | Sasaki et al. |
| 2008/0030509 A1* | 2/2008 | Conroy et al. ............... 345/502 |
| 2008/0034238 A1* | 2/2008 | Hendry et al. ............... 713/323 |
| 2008/0130543 A1 | 6/2008 | Singh et al. |
| 2008/0136844 A1* | 6/2008 | Takada et al. ............... 345/690 |
| 2008/0155478 A1 | 6/2008 | Stross |
| 2008/0158233 A1 | 7/2008 | Shah et al. |
| 2008/0172626 A1 | 7/2008 | Wu |
| 2008/0297433 A1 | 12/2008 | Heller et al. |
| 2008/0320321 A1 | 12/2008 | Sutardja |
| 2009/0021450 A1 | 1/2009 | Heller et al. |
| 2009/0031329 A1 | 1/2009 | Kim |
| 2009/0059496 A1 | 3/2009 | Lee |
| 2009/0109159 A1 | 4/2009 | Tsai |
| 2009/0153540 A1 | 6/2009 | Blinzer et al. |
| 2009/0160865 A1 | 6/2009 | Grossman |
| 2009/0172450 A1 | 7/2009 | Wong et al. |
| 2009/0193243 A1 | 7/2009 | Ely |
| 2010/0010653 A1 | 1/2010 | Bear et al. |

(56) References Cited

U.S. PATENT DOCUMENTS

| | | | |
|---|---|---|---|
| 2010/0033433 A1 | 2/2010 | Utz et al. | |
| 2010/0033916 A1 | 2/2010 | Douglas et al. | |
| 2010/0085280 A1 | 4/2010 | Lambert et al. | |
| 2010/0091025 A1* | 4/2010 | Nugent et al. | 345/502 |
| 2011/0102446 A1 | 5/2011 | Oterhals et al. | |
| 2011/0141133 A1 | 6/2011 | Sankuratri et al. | |
| 2012/0108330 A1 | 5/2012 | Dietrich, Jr. et al. | |
| 2012/0162238 A1 | 6/2012 | Fleck et al. | |
| 2012/0268480 A1 | 10/2012 | Cooksey et al. | |
| 2014/0168229 A1 | 6/2014 | Ungureanu; Oreste Dorin ; | |
| 2014/0184611 A1 | 7/2014 | Wyatt; David ; | |
| 2014/0184629 A1 | 7/2014 | Wyatt; David ; | |

OTHER PUBLICATIONS

"System Management Bus (SMBus) Specification", Version 2.0 Aug. 3, 2000, pp. 1-59.*
Vulcan Inc., "Connectivity FAQ", p. 1. Downloaded from the internet on Sep. 20, 2005 from http://www.flipstartpc.com/fac_connectivity.asp.*
"Graphics: Intel®82852/82855 Graphics Controller Family" Intel, Archived Nov. 2, 2006 by archive.org and downloaded @ http://web.archive.org/web/20061103045644/http://www.intel.com/support/graphics/inte1852gm/sb/CS-009064.htm?.*
"Epson; EMP Monitor V4, 10 Operation Guide", by Seiko Epson Corp., 2006 http://support.epson.ru/products/manuals/100396/Manual/EMPMonitor.pdf.
"Virtual Network Computing", http://en.wikipedia.org/wikiVnc, Downloaded Circa: Dec. 18, 2008, pp. 1-4.
Andrew Fuller; "Auxiliary Display Platform in Longhorn"; Microsoft Corporation; The Microsoft Hardware Engineering Conference Apr. 25-27, 2005; slides 1-29.
McFedries, ebook, titled "Complete Idiot's Guide to Windows XP", published Oct. 03, 2001, pp. 1-7.
PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.
Vulcan, Inc., "Product Features: Size and performance", p. 1; downloaded from the internet on Sep. 20, 2005 from http://www.flipstartpc.com/aboutproduct_features_sizeandpower.asp.
Vulcan, Inc., "Product Features:LID Module", p. 1, downloaded from the Internet on Sep. 19, 2005 from http://www.flipstartpc.com/aboutproductfeatures_lidmodule.asp.
Vulcan, Inc., "Software FAQ", p. 1, downloaded from the internet on Sep. 20, 2005 from http://www.flipstartpc.com/faq_software.asp.
Handtops.com, "FlipStart PC in Detail" pp. 1-4, downloaded from the internet o Sep. 20, 2005 from http://www.handtops.com/show/news/5.
Microsoft Corporation, "Microsoft Windows Hardware Showcase", dated Apr. 28, 2005; pp. 1-5; downloaded from the internet on Sep. 15, 2005, from http://www.microsoft.com/whdc/winhec/hwshowcase05.mspx.
Paul Thurrot's SuperSite for Windows, "WinHEC 2004 Longhorn Prototypes Gallery", dated May 10, 2004, pp. 1-4, downloaded from the internet on Sep. 15, 2005 from http://www.sinwupersite.com/showcase.loghom_winhc_proto.asp.
"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/JavarTutorial/uiswing/components/combobox.html.
"Usage: NVIDIA GeForce 6800— PCIe x16", Dell, archived Jan. 15, 2006 by archive.org, Downloaded Jun. 29, 2011, http://web.archive.org/web/20060115050119/http://support.dell.com/support/edocs/video/P82192/en/usage.html.
Texas Instruments, "TMS320VC5501/5502 DSP Direct Memory Access (DMA) Controller Reference Guide", Sections 1, 2, 4, 11, and 12; Literature No. SPRU613G, Mar. 2005.

* cited by examiner

900

```
┌─────────────────────────────────────┐
│ DIRECTING TRANSITIONING OF A PANEL TO A │
│          QUIESCENT STATE            │
│                910                  │
└─────────────────────────────────────┘
                  │
┌─────────────────────────────────────┐
│ CHANGING DRIVING OF DISPLAY INTERFACE │
│   SIGNALS FROM A FIRST GRAPHICS     │
│  PROCESSOR TO A SECOND GRAPHICS     │
│              PROCESSOR              │
│                920                  │
└─────────────────────────────────────┘
                  │
┌─────────────────────────────────────┐
│ DIRECTING TRANSITIONING OF THE PANEL TO │
│           AN ACTIVE STATE           │
│                930                  │
└─────────────────────────────────────┘
```

FIGURE 9

MULTIPLE GRAPHICS PROCESSING UNIT SYSTEM AND METHOD

FIELD OF THE INVENTION

The present invention relates to the field of displaying presentations associated with graphics processing units.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities often involve the presentation of various graphics information on a display.

Graphics applications associated with the display presentations can have different characteristics and features. For example, graphics applications can have different processing requirements, different quality features, involve different levels of complexity, and so on. A system may include multiple graphics processing units and the graphics processing units can also have different processing capabilities and characteristics. In addition, control software and hardware for each processor may be entirely different (e.g., processors manufactured by different vendors, etc.)and not able to be controlled identically. Furthermore, displays typically can only handle input from one graphics processing unit at a time and often have particular interface requirements. For example, if signaling is not performed correctly damage to the panel may result, or the user may observe disturbing visual artifacts, or the panel controller may force a failsafe shutdown.

Displays typically have panel power sequencing specifications that indicate signal activation timing requirements. For example, the standards panel working group (SPWG) indicates general mechanical and interface specifications (e.g., SPWG spec, http://www.spwg.org) for displays used in note book computers. FIG. 1A is an exemplary timing diagram for one panel power sequence for a LCD power control signal (LCD_EN), active LVDS signals (LVDS) and a LCD backlight control (B/L). The timing requirements between the transitions in the signals are typically defined by the display manufacturer.

SUMMARY

Systems and methods for utilizing multiple graphics processing units for controlling presentations on a display are presented. In one embodiment, a dual graphics processing system includes a first graphics processing unit for processing graphics information; a second graphics processing unit for processing graphics information; and a component for controlling switching between the first graphics processing unit and the second graphics processing unit. In one embodiment, the component for controlling complies with appropriate panel power sequencing operations when coordinating the switching between the first graphics processing unit and the second graphics processing unit.

DESCRIPTION OF THE DRAWINGS

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

FIG. 9 is a flow chart exemplary of another graphics processing unit change over process in accordance with one embodiment of the present invention.

DETAILED DESCRIPTION

Figure 1A:
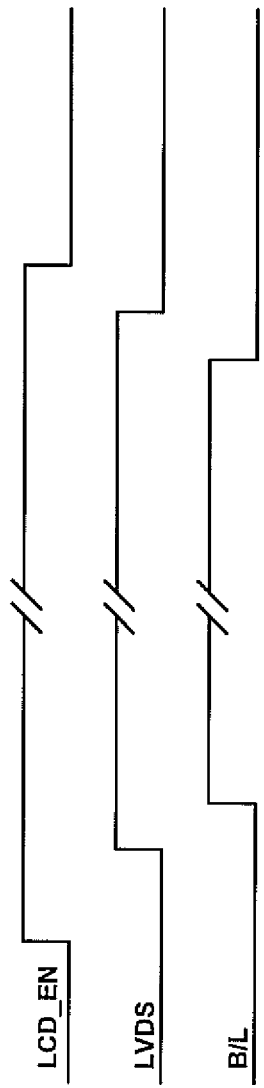
FIG. 1A is an exemplary timing diagram for one panel power sequence.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" accessing," "writing," "including," "storing," "transmitting," "traversing," "associating," "identifying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Portions of the detailed description that follows are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

The present invention facilitates efficient effective utilization of multiple graphics processing units or hybrid graphics processing system. In one embodiment, a dual graphics processing system includes a first graphics processing unit for processing graphics information, a second graphics processing unit for processing graphics information, and a component for controlling switching between the first graphics processing unit and the second graphics processing unit. In one exemplary implementation, the component for controlling switching between the first graphics processing unit and the second graphics processing unit includes a multiplexer that forwards display component signals from the first graphics processing unit and the second graphics processing unit in accordance with a graphics processing unit selection indication. The component for controlling conforms to panel power sequencing when coordinating the switching between the first graphics processing unit and the second graphics processing unit. In one embodiment the first graphics processing unit is an integrated graphics processing unit and the second graphics processing unit is a discreet graphics processing unit.

Figure 1B:
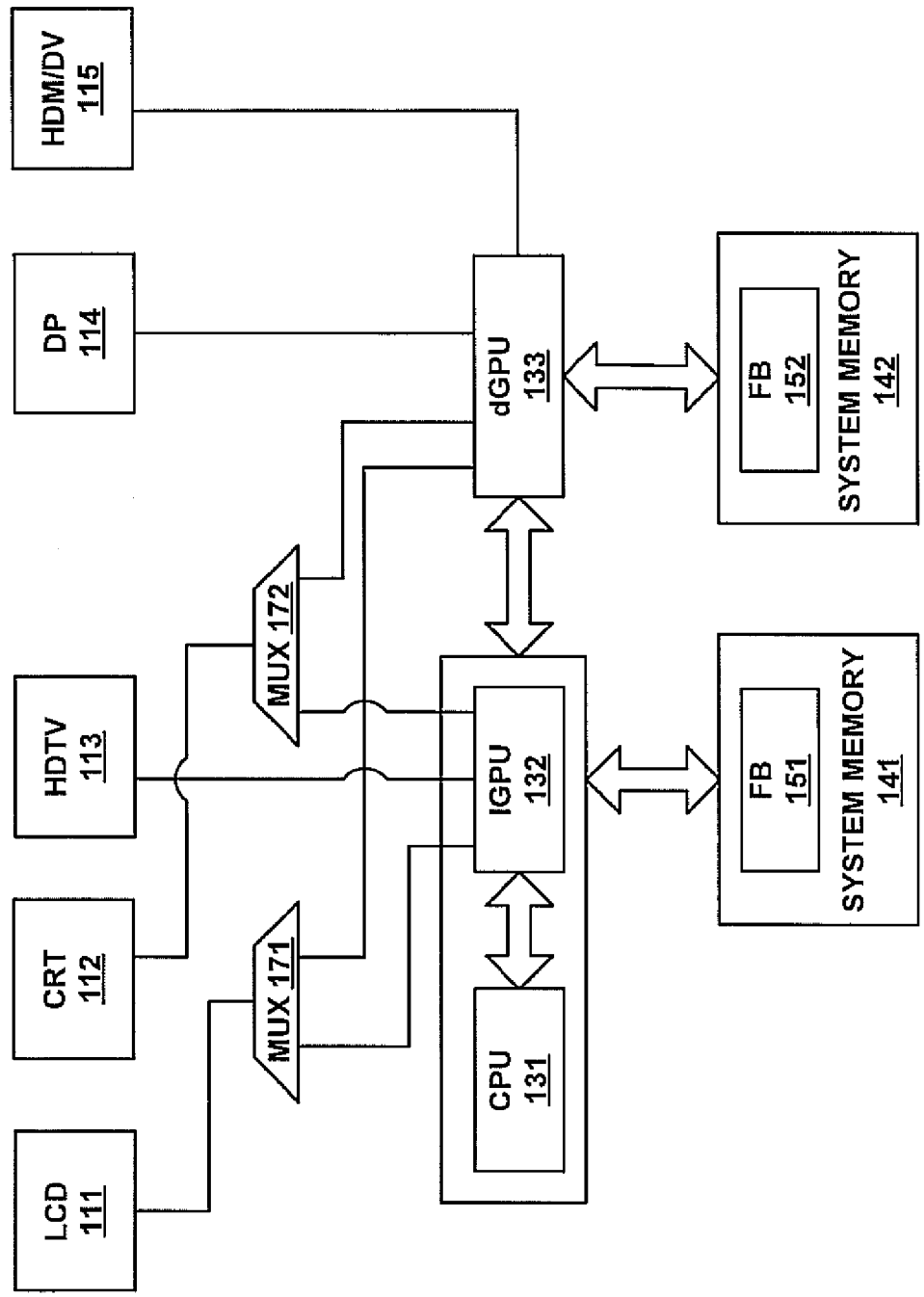
FIG. 1B is a block diagram of an exemplary computer system in accordance with one embodiment of the present invention.

FIG. 1B is block diagram of exemplary computer system 100 in accordance with one embodiment of the present invention. Computer system 100 includes central processing core (CPU) 131, integrated graphics processing unit 132 (iGPU), discrete graphics processing unit (dGPU) 133, system memory 141, local memory 142, liquid crystal display (LCD) 111, cathode ray tube display (CRT) 112, high definition television display (HDTV) 113, display port (DP) 114, high definition multimedia interface/digital video interface (HDMI/DVI) 115, multiplexer (MUX) 171 and multiplexer (MUX) 172. System memory 141 includes frame buffer (FB) 151 and local memory 142 includes frame buffer (FB) 152. In one embodiment, iGPU 132 is integrated with CPU 131.

The components of exemplary computer system 100 cooperatively operate to arbitrate control of a display between two graphics controllers. CPU 131 performs core central processing operations. First graphics processing unit iGPU 132 processes graphics information. Second graphics processing unit dGPU 133 processes graphics information. MUX 171 controls switching between the iGPU 132 and the dGPU 133. MUX 171 forwards display component signals from the first graphics processing unit and the second graphics processing unit in accordance with a graphics processing unit selection indication. MUX 172 also controls switching between the iGPU 132 and the dGPU 133. System memory 141 and local memory 142 store information. LCD 111, CRT 112, and HDTV 113 display information. DP 114, and (HDMI/DV) 115 interfaces can forward information for display. In one embodiment a panel control signal transmitted from the first graphics processing unit is utilized as a feedback event to trigger the switching to the second graphics processor.

Figure 2:
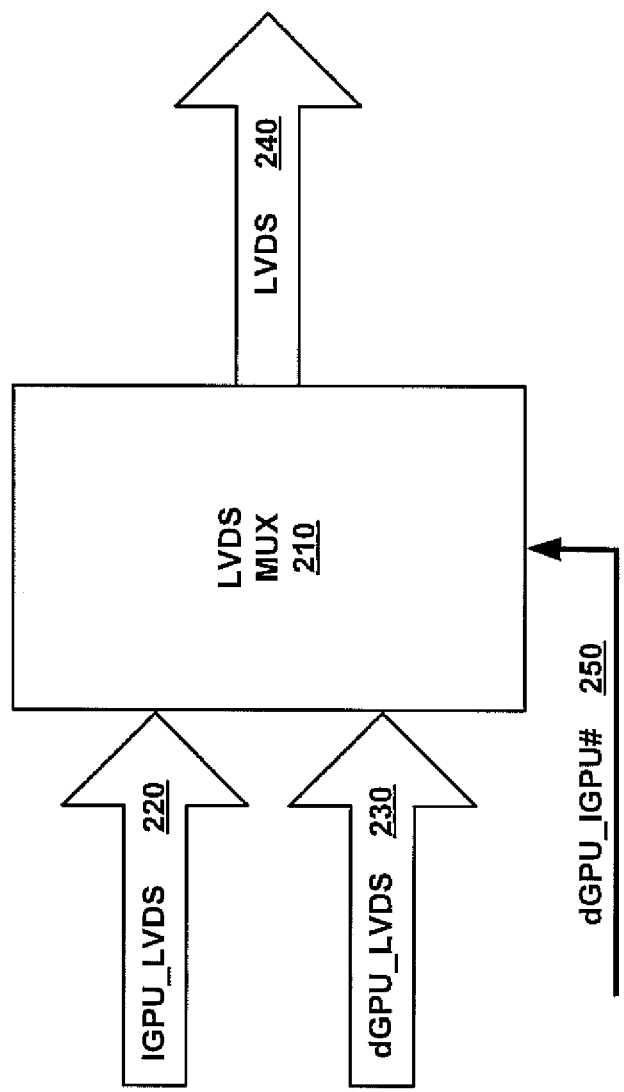
FIG. 2 is a block diagram of one exemplary implementation of a MUX for controlling switching between the first graphics processing unit and the second graphics processing unit.

It is appreciated the component for controlling switching between the first graphics processing unit and the second graphics processing unit can be implemented in a variety of ways. FIG. 2 is a block diagram of one exemplary implementation of MUX 210 for controlling switching between the first graphics processing unit and the second graphics processing unit. MUX 210 receives graphics signals from iGPU (e.g., iGPU_LVDS, etc.) and dGPU (e.g., dGPU_LVDS, etc.) and forwards one set of graphics signals in accordance with selection indication (e.g., DGPU_IGPU#) and selects which processor's set of graphics signals are forwarded to a panel. In the illustrated example the graphics signals include low voltage differential signals (LVDS). It is appreciated that present invention is readily implemented with graphics signals for other types or displays (e.g., CRT, etc.).

In one embodiment, the LVDS signals are muxed but the backlight intensity (e.g., pulse width modulation intensity control and inverter enable) is continued to be controlled by one processor (e.g., the iGPU). In some exemplary implementations, the backlight inverter and CCRL backlight source can take a considerable amount of time to charge to full intensity and the present embodiment facilitates reduction of visual artifacts of fading or flashing by providing more persistent backlight control.

The component for controlling switching between the first graphics processing unit and the second graphics processing unit can be implemented in a variety of ways can also include components for controlling display activation. In one exemplary implementation, the components for controlling display activation can facilitate compliance with panel power sequence operations and requirements. In one embodiment, the component for controlling switching between the first graphics processing unit and the second graphics processing unit includes a panel power sequence control component comprising a first graphics processing unit display enable component for coordinating display component enablement indication from the first graphics processing unit with a graphics processing selection indication, a second graphics processing unit display enable component for coordinating display component enablement indication from the second graphics processing unit with the graphics processing selection indication; and a display component enable generation component for generating a display component enable signal in accordance with output of the first graphics processing unit display enable component and output of the second graphics processing unit display component.

Figure 3:
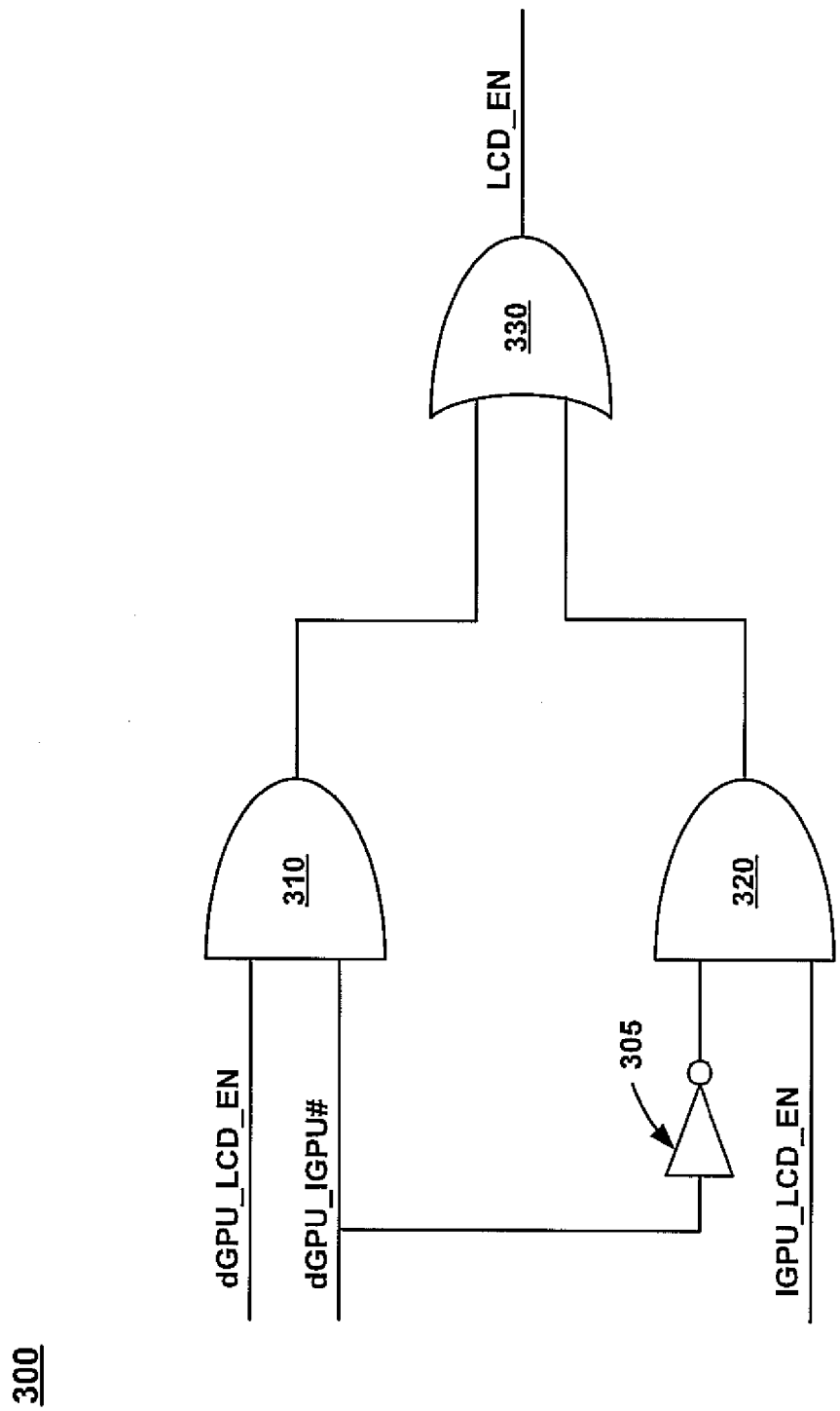
FIG. 3 is a block diagram of an exemplary panel power sequence control component in accordance with one embodiment of the present invention.

FIG. 3 is a block diagram of exemplary panel power sequence control component 300 in accordance with one embodiment of the present invention. A first graphics processing unit display enable component includes AND gate 320 for coordinating display component enablement indication IGPU_LCD_EN from the first graphics processing unit with a graphics processing unit selection indication DGPU_IGPU#. In one embodiment, the indication DGPU_IGPU# is inverted before being fed into AND gate 320. The second graphics processing unit display enable component includes AND gate 310 for coordinating display component enablement indication DGPU_LCD_EN from the second graphics processing unit with the graphics unit processing selection indication DGPU_IGPU#. The display component enable generation component OR gate 330 generates a display component enable signal LCD_EN in accordance with output of the first graphics processing unit display enable component AND gate 310 and output of the second graphics processing unit display component AND gate 320.

In one embodiment, components similar to exemplary panel power sequence control component 300 can also be utilized to forward GPU backlight control signals (e.g. Pulse Width Modulated Intensity Control and Inverter Enable). Power panel sequencing logic can sequence the backlight as well as power control.

Figure 4:
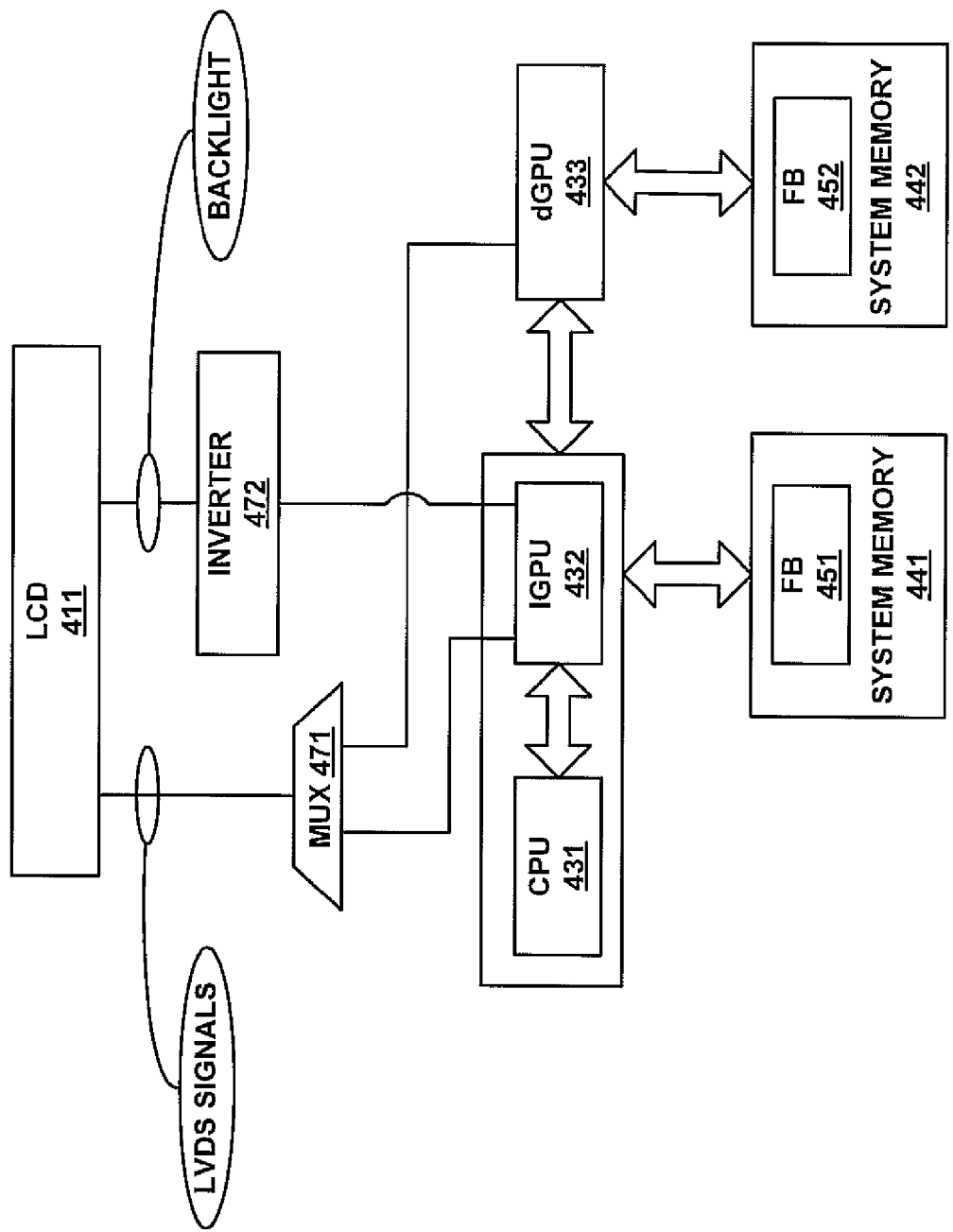
FIG. 4 is a block diagram of an exemplary computer system in which one processor controls a backlight intensity while another processor controls backlight enablement and other display interface signals in accordance with one embodiment of the present invention.

FIG. 4 is a block diagram of exemplary computer system 400 in accordance with one embodiment of the present invention. Exemplary computer system 400 is similar to exemplary computer system 100 except backlight control is different. In exemplary computer system 400, while the backlight enable is driven by the discrete graphics processing unit, a backlighting intensity signal is driven by the internal graphics processing unit even after control of other display signals is transferred to the discrete graphics processing unit. Exemplary computer system 400 includes central processing core (CPU) 431, integrated graphics processing unit 432 (iGPU), discrete graphics processing unit (dGPU) 433, system memory 441, local memory 442, liquid crystal display (LCD) 411, multiplexer (MUX) 471 and inverter 472. System memory 441 includes frame buffer (FB) 451 and local memory 442 includes frame buffer (FB) 452.

The components of exemplary computer system 400 cooperatively operate to arbitrate control of a display between two graphics controllers. CPU 431 performs core central processing operations. First graphics processing unit iGPU 432 processes graphics information. Second graphics processing unit dGPU 433 processes graphics information. MUX 471 controls switching between the iGPU 432 and the dGPU 433. MUX 471 forwards display component signals from the first graphics processing unit and the second graphics processing unit in accordance with a graphics processing unit selection indication. System memory 441 and local memory 442 store information. LCD 411 display information. Inverter 472 inverts backlight control signals from iGPU 432 (e.g. pulse width modulated intensity control). In one embodiment, the backlight enable signal (not shown) is provided to inverter 472 from the dGPU 433.

Figure 5:
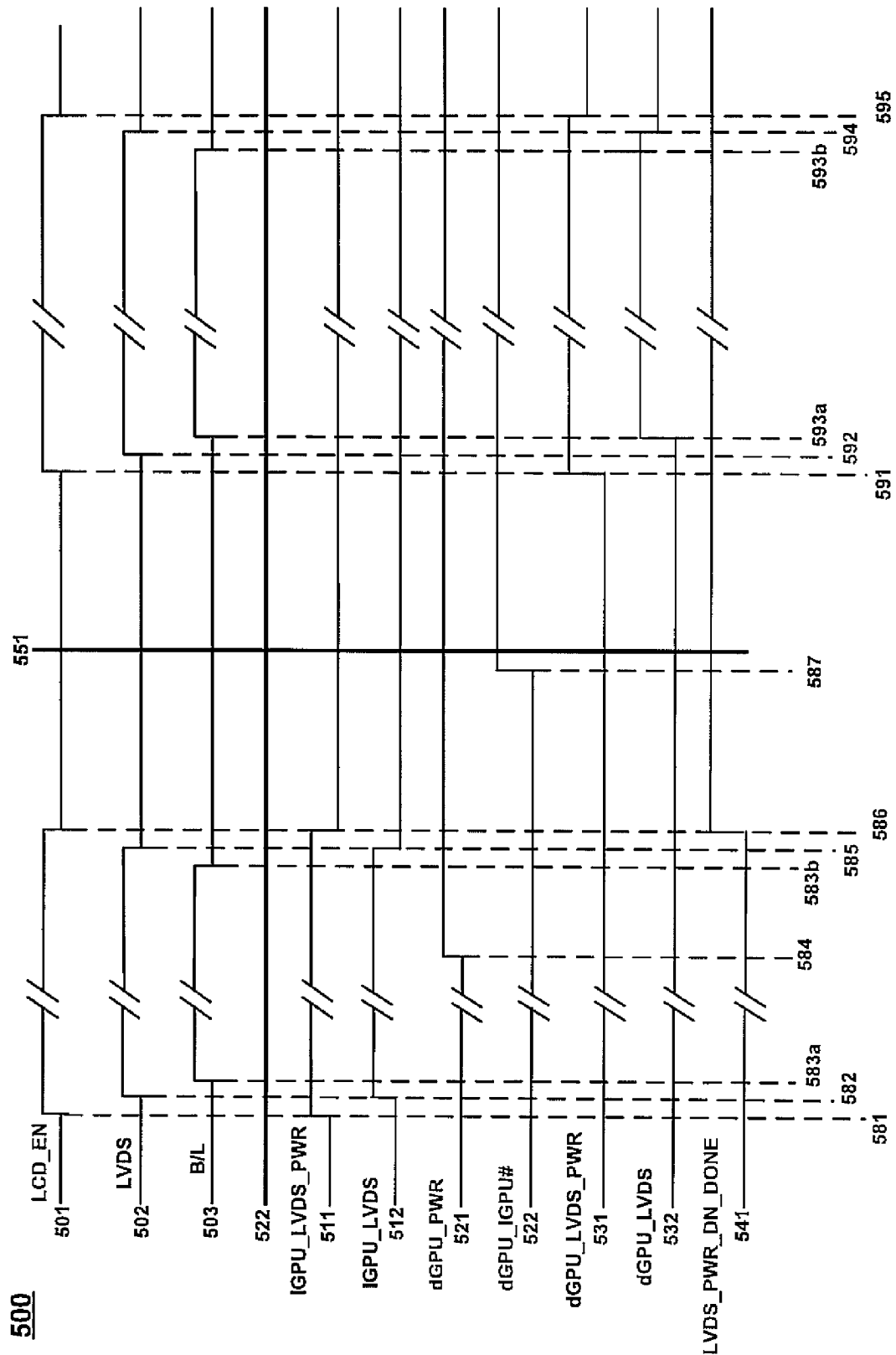
FIG. 5 is an exemplary timing diagram of control signals in accordance with one embodiment of the present invention.

FIG. 5 is an exemplary timing diagram 500 of control signals in accordance with one embodiment of the present invention. The timing diagram 500 includes signals that are fed into and forwarded out of a component for controlling switching between the first graphics processing unit and the second graphics processing unit (e.g., MUX 171, 471, 172, etc.). In one embodiment, timing diagram 500 illustrates states of signals when an iGPU generated signals are being forwarded to a display (e.g. the state of signals on the left side of line 551) and states of signals when a dGPU generated signals are being forwarded to a display (e.g. the state of signals on the right side of line 551).

In one exemplary implementation, signals iGPU-LVDS-PWR 511 and dGPU-LVDS-PWR 531 are fed into a panel power sequence control component (e.g., 300 in FIG. 3) and signal LCD_EN 501 is forwarded to a display while signals 512 and 532 are fed into a (e.g., MUX 171, 210, 471, etc.) and signals 502 are forwarded from the MUX to the display (e.g., LCD 111, etc.). In one embodiment, iGPU-LVDS-PWR 511 corresponds to iGPU_LCD_EN fed into AND gate 320 and dGPU-LVDS-PWR 531 corresponds dGPU_LCD_EN fed into AND gate 310 and LCD_EN 501 corresponds to LCD_EN out of OR gate 330. Thus, the display essentially receives signals LCD_EN 501 and LVDS 502 and these signals appear as if coming from a single graphics processing unit, while signals 511, 512, 531 and 532 are in essence driving the display depending upon whether iGPU or dGPU is the active graphics processing unit. The iGPU LVDS power (iGPU-LVDS_PWR) signal is activated at time 581 and the LCD enable (LCD_EN) signal is forwarded to the LCD. The iGPU is the active device and after an appropriate panel power sequence time has passed the iGPU-LVDS signals are activated at time 582. It is appreciated the present illustration is utilized to indicate the LVDS signals are activated rather than any particular logic transitions or states associated with particular graphics information. For example, an iGPU_LVDS signal for conveying a change in a color from red to green may go through multiple logic transitions associated with bits representing the color red and green during the iGPU_LVDS active period. The backlight enable (B/L) signal 503 is activated at time 583*a* and deactivated at time 583*b*.

When the system receives a signal indicating a transition from the iGPU to the dGPU should begin, the dGPU power up signal (dGPU_PWR) is triggered at time 584 to enable or power up the dGPU itself in anticipation of a change from the iGPU control to dGPU control. The LCD mode and timings are established on the dGPU while the dGPU LVDS interface is still off. A panel power down sequence is commenced on the iGPU. At time 585 the iGPU_LVDS signals 512 are deactivated resulting in the LVDS signals 502 forwarded to the display becoming deactivated. At time 586 the IGPU_LVDS_PWR signal 511 is deactivated and correspondingly LCN_EN signal 501 is also deactivated. Selection indication dGPU_iGPU# signal 522 is changed from a state indicating the iGPU is forwarding signals to a state indicating the dGPU is going to forward signals and the MUX in turn will forward the dGPU signals instead of the iGPU signals.

With reference still to FIG. 5, the dGPU is instructed (e.g., by a driver, etc.) to begin panel power sequence and the dGPU signals are utilized after the transition at line 551. The dGPU_LVDS_PWR signal is activated at time 591 resulting in LCD_EN signal 501 being activated. At time 592 dGPU_LVDS signal is activated which in turn means the LVDS signal 502 is activated. At time 593*a* the backlight signal is reactivated and deactivated at time 593*b*. It is appreciated the backlight can be driven in accordance with a variety of scenarios. The backlight can be deactivated and reactivated to be driven by the dGPU or some of the backlight signals (e.g., pulse width modulated intensity and inverter enable) can be again be driven by the iGPU even when the dGPU is driving the backlight enable and the LVDS signals. At time 594 the dGPU_LVDs signal is deactivated and in turn the LVDS signals 502 are deactivated. At time 595 the dGPU_LVDS_PWR signal is deactivated resulting in the LCN_EN being deactivated.

In one embodiment, when the deactivation of the iGPU driving of the display enable (e.g., LCD_EN) occurs the operations wait for the process to complete from an Operating System perspective. In one embodiment, the LVDS_PWR_DOWN_DONE 541 signal is utilized to trigger the selection indication signal dGPU_iGPU# signal at time 586 instead of 587. Utilizing the LVDS_PWR_DOWN_DONE 541 signal reduces the possibility that the OS is performing some other processing and takes some time to perceive the display enable deactivation completion. In one exemplary implementation there is a component that filters the panel power sequence signals and uses the result directly as a signal drive back to the software to coordinate the transition.

It is appreciated that while an iGPU to dGPU transition is illustrated in FIG. 5, a similar process can be performed for a dGPU to iGPU transition. In one embodiment the entities are reversed. In addition, after an initial power up of the iGPU the iGPU can remain powered up (e.g., other things being equal) rather than powering up and down that may be associated with a dGPU. For example, if a hybrid system included a iGPU in a CPU and a dGPU, since the CPU remains powered up the iGPU can remain powered up while dGPU is powered down.

Figure 6:
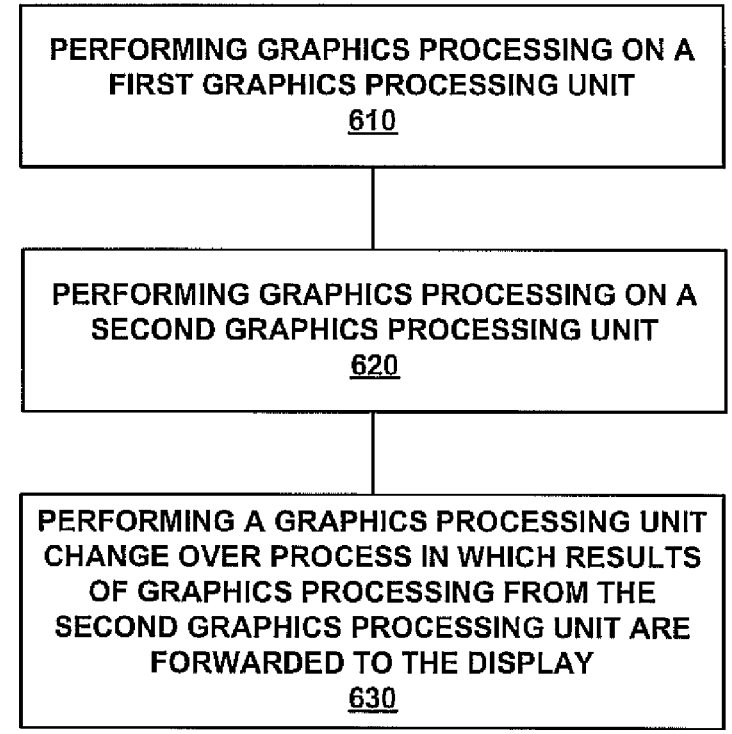
FIG. 6 is a block diagram of exemplary dual graphics processing method in accordance with one embodiment of the present invention.

FIG. 6 is a block diagram of exemplary dual graphics processing method 600 in accordance with one embodiment of the present invention. In one embodiment there is an agent which is going to help coordinate the process or transaction by talking to drives associated with multiple processors. In one exemplary implementation, the agent is "hybrid" software instructions embedded on a computer readable medium and the instructions direct driver operations on a processor.

In operation 610, graphics processing is performed on a first graphics processing unit and the results are forwarded to a display. It is appreciated a variety of graphics processing applications can be performed. For example, 2D graphics processing, 3D graphics processing, video processing, etc.

In operation 620, graphics processing is performed on a second graphics processing unit. In one embodiment, the second graphics processing unit is essentially working on the same graphics processing application as the first graphics processing unit in anticipation of a change over. By working on the same graphics processing application the second graphics processing unit can be ready with information to make the change over appear relatively seamless from a viewing user perspective.

At operation 630, a graphics processing unit change over process is performed in which results of graphics processing from the second graphics processing unit are forwarded to the display instead of results from the first graphics processor. In one embodiment the graphics processing unit change over process includes panel power sequencing operations. It is appreciated that present process is readily adaptable to a variety of change over interactions.

Figure 7:
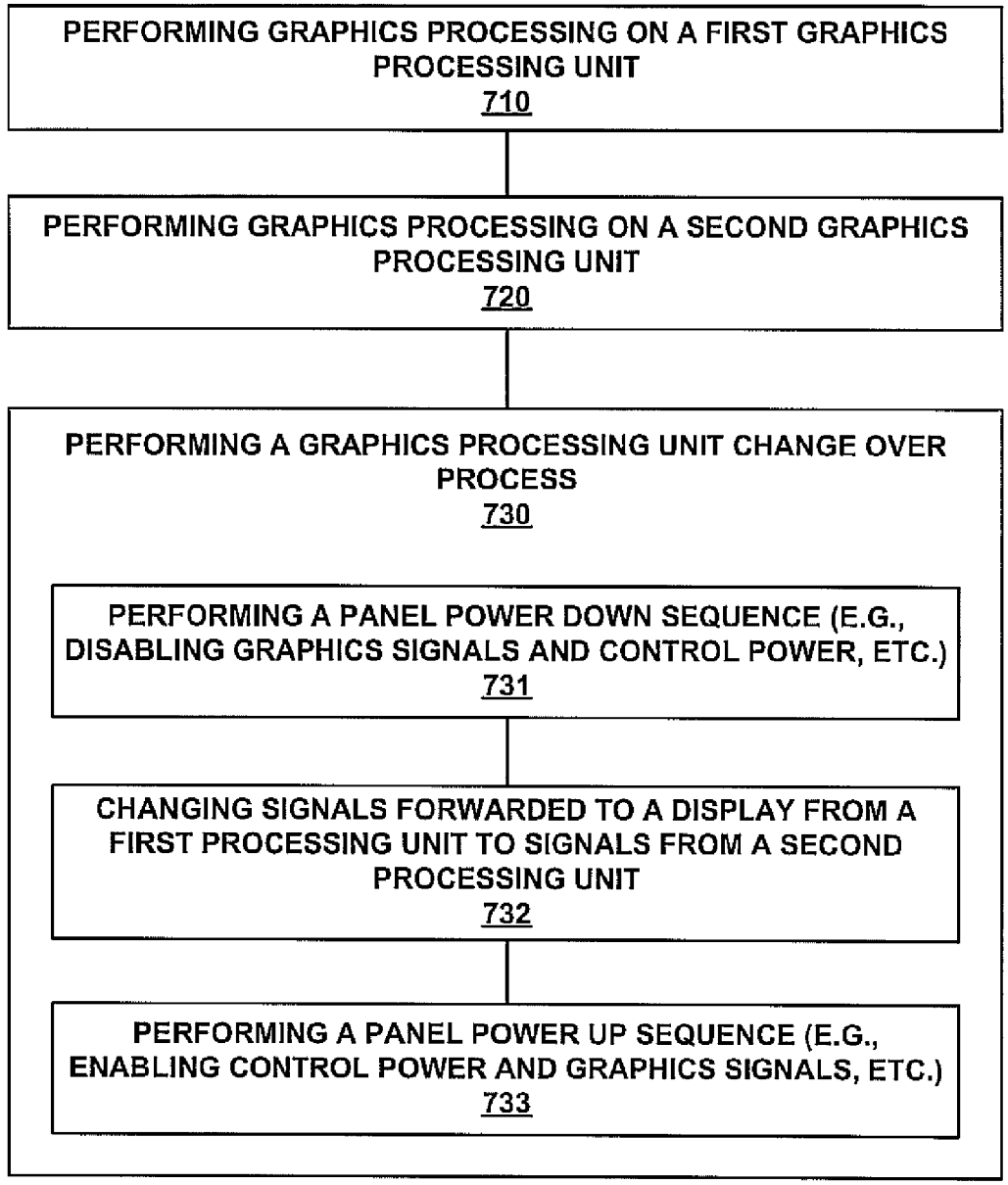
FIG. 7 is a flow chart of another exemplary dual graphics processing method in accordance with one embodiment of the present invention.

FIG. 7 is a flow chart of exemplary dual graphics processing method 700 in accordance with one embodiment of the present invention. Dual graphics processing method 700 is similar to dual graphics processing method 600.

In operation 710 graphics processing is performed on a first graphics processing unit, in operation 720 graphics processing is performed on a second graphics processing unit, and in operation 730 a change over process is performed.

The change over process in operation 730 includes panel power sequencing operations. In operation 731 a panel power down sequence is performed. In one exemplary implementation, the panel power down sequence includes disabling communication of graphics information signals (e.g., LVDS, etc.) and control power (e.g., LCD_EN, etc.) to a panel interface. In operation 732 signals forwarded to a display from a first processing unit are changed to signals from a second processing unit. It is appreciated a variety of components can be utilized to in the change over (e.g., a switching component, MUX, crossbar, routing component, etc.). In operation 733 a panel power up sequence is performed. In one exemplary implementation, the panel power up sequence includes enabling control power (e.g., LCD_EN, etc.) and communication of graphics information signals (e.g., LVDS, etc.) to a panel interface.

Figure 8:
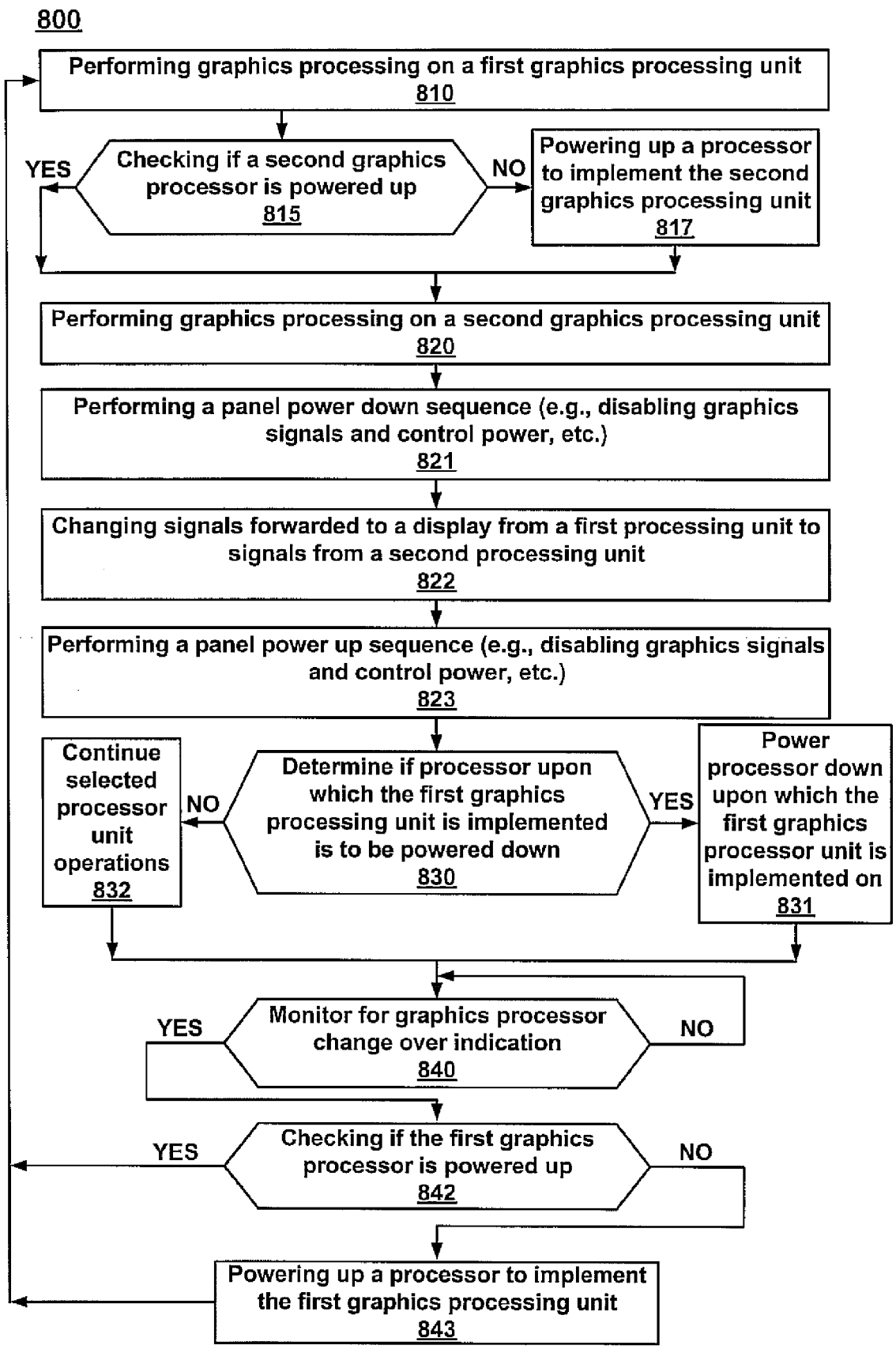
FIG. 8 is a flow chart of exemplary graphics processing unit change over process with powering up and down the graphics processing units in accordance with one embodiment of the present invention.

The graphics processing unit change over process can include powering up and down the graphics processing units. FIG. 8 is a flow chart of exemplary graphics processing unit change over process 800 with powering up and down the graphics processing units in accordance with one embodiment of the present invention. Graphics processing unit change over process 800 includes powering up a graphics processing unit; checking if a another graphics processing unit is powered up; powering up the other graphics processing unit if not already powered up; and changing information forwarded to a display from the first graphics processing unit to the second graphics processing unit.

In operation 810, graphics processing is performed on a first graphics processing unit.

Operation 815 checks if a second graphics processor is powered up. If powered up the process proceeds to operation 820. If not powered up the process proceeds to operation 817.

In operation 817, a processor is powered up to implement the second graphics processing unit. Powering up the processor can include a cold power, wake up from idle state, enabling graphics processing capabilities on a processor that is otherwise already powered up. In one exemplary implementation integrated power processing capabilities are enabled on a processor (e.g., CPU, etc.) that is otherwise powered up.

In operation 820, graphics processing is performed on a second graphics processing unit.

A panel power down sequence is performed in operation 821. In one embodiment the panel power down sequence includes disabling signals on the display interface (e.g., graphics signals, control power etc.). In one exemplary implementation, the panel power down sequence is performed in accordance with the panel power sequence instructions from the panel vendor or manufacturer.

At operation 822, signals forwarded to a display are changed from a first processing unit to signals from a second processing unit. Again, it is appreciated a variety of components can be utilized to in the change over (e.g., a switching component, MUX, crossbar, routing component, etc.).

A panel power up sequence (e.g., disabling graphics signals and control power, etc.) is performed at operation 823. In one embodiment the panel power up sequence includes enabling signals on the display interface (e.g., graphics signals, control power etc.). In one exemplary implementation, the panel power updown sequence is performed in accordance with the panel power sequence instructions from the panel vendor or manufacturer.

In operation 830, a determination is made if a processor upon which the first graphics processing unit is implemented is to be powered down. In one exemplary implementation if the first graphics processing unit is implemented in an integrated processor (e.g., CPU, etc.) the integrated processor is not powered down and if the first graphics processing unit is implemented in a discrete processor (e.g., GPU, etc.) the discrete processor is powered down. If the processor is to not to be powered down the process proceeds to operation 832. If the processor is to be powered down the process proceeds to operation 831.

At operation 831 power down is performed upon the processor which the first graphics processor unit is implemented on. The power down can include full power down, partial power down, sleep mode, etc. The process proceeds to operation 840.

At operation 832 selected processor unit operations are continued. In one exemplary implementation in which the first graphics processing unit is implemented in an integrated processor (e.g., CPU, etc.), processing operations other than integrated graphics processing operations are continued to be performed.

In operation 840 monitoring for graphics processor change over indication is performed. The graphics processor change over indication can come from a user, from a graphics application, from an indication of a particular type of graphics processing being performed (e.g., high performance such as video etc. versus low performance such as text, etc.), from detection of an environmental condition, etc. If there is not indication the process continues to monitor in operation 840. If there is a graphics processor change over indication the process proceeds to operation 842

At operation 842 a check is made if the first graphics processor is powered up. If the first graphics processor is powered up the process proceeds back to operation 810. If the first graphics process is not powered up the process proceeds to operation 843.

At operation 843 the first graphics processor is powered up and the process returns to operation 810.

It is appreciated the present graphics processing unit change over processes can be implemented in a system in which the first graphics processing unit is an internal graphics processing unit and the second graphics processing unit is a discrete graphics processing unit. In one embodiment, a panel control signal transmitted from the first graphics processing unit is utilized as a feedback event to trigger the changing to a second graphics processor.

FIG. 9 is a flow chart exemplary of graphics processing unit change over process 900 in accordance with one embodiment of the present invention. In one embodiment, graphics processing unit change over process instruction are embedded on a computer readable medium. Similar to process 600 there is an agent which facilitates coordination of the process or transaction by talking to drives associated with multiple processors.

At block 910, a transition to a panel quiescent state is directed. In one embodiment, the transitioning to a quiescent state comprises performing a panel power down process. In one exemplary implementation, independent panel power sequences are utilized in the transitioning to a quiescent state and transitioning to the active state. In one embodiment, some of the backlight controls are driven by the first graphics processing unit.

The signals forwarded to a display are changed from a first graphics processor to a second graphics processor at block 920. In one embodiment, the changing signals from a first graphics processor to a second graphics processor comprises loading drivers associated with the second graphics processing unit.

At operation 930, a transition to a panel active state is directed. In one embodiment, the transitioning to an active state comprises performing a panel power up process.

It is appreciated that the present change over systems and methods enable each processor to control a panel power sequence in each controller's own fashion. In addition, by coordinating the LCD power enable features, the present approach facilitates reduction of possible panel control signal excursion, panel failure and possible damage associated with undeterministic timing in signals associated with the transition from one processor to another. For example, during a transition interval the time taken to re-apply valid timings on the panel interface is affected by driver software response time which is affected by operating system response time and other activities on the system, without the present invention timing could be undeterministic. Operating systems are often not real time, and do not typically have guaranteed latency. Without the present invention, adverse impacts could occur if a system becomes busy right at the middle of the transition exceeding the maximum allowed interval set forth the panel specification.

In one embodiment, precise co-ordinated control of internal sequencing on both the integrated and discrete graphics processing units is available and the LCD power enable is kept applied while the LVDS signals are modulated. In one exemplary implementation, the mode on the other GPU is set prior to transition as set forth above. An additional hardware signal and state machine between the two GPU's is included. The additional hardware signal and state machine signal the panel power sequencing logic of the second GPU when the first GPU's transition is completed. In one embodiment, the state machine controls the MUX select in order to facilitate minimal transition time.

Thus, the present invention facilitates efficient and effective utilization of multiple processors with a display. Each process can start LVDS frame timings at a random point in time and the present processor change over approach facilitates synchronization of the LVDS signals and avoidance of artifacts on the panel. For example, artifacts associated with several frames that could otherwise pass before the panel controller re-syncs to the alternate processor's timing. By following panel power sequencing in accordance with present embodiments, the panel controller treats the transition as a "normal" on/off transition and masks artifacts from the shift in timings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A dual graphics processing system comprising:
    a first graphics processing unit for processing graphics information;
    a second graphics processing unit for processing graphics information; and
    a component for controlling switching between said first graphics processing unit and said second graphics processing unit, wherein a backlighting signal is driven by said first graphics processing unit even after a switch to said second graphics processing unit.

2. A dual graphics processing system of claim 1 wherein said component for controlling switching between said first graphics processing unit and said second graphics processing unit comprises a multiplexer that forwards display component signals from said first graphics processing unit and said second graphics processing unit in accordance with a graphics processing unit selection indication.

3. A dual graphics processing system of claim 1 wherein said component for controlling switching between said first graphics processing unit and said second graphics processing unit comprises:
    a first graphics processing unit display enable component for coordinating display component enablement indication from said first graphics processing unit with a graphics processing selection indication;
    a second graphics processing unit display enable component for coordinating display component enablement indication from said second graphics processing unit with said graphics processing selection indication; and
    a display component enable generation component for generating a display component enable signal in accordance with output of said first graphics processing unit display enable component and output of said second graphics processing unit display component.

4. A dual graphics processing system of claim 1 wherein said a first graphics processing unit display enable component and said second graphics processing unit display enable component are AND logic components and said display component enable generation component is an OR logic component.

5. A dual graphics processing system of claim 1 wherein said component for controlling conforms to panel power sequencing when coordinating said switching between said first graphics processing unit and said second graphics processing unit.

6. A dual graphics processing system of claim 1 wherein said first graphics processing unit is an internal graphics processing unit and said second graphics processing unit is a dedicated graphics processing unit.

7. A dual graphics processing system of claim 1 wherein a panel control signal transmitted from said first graphics processing unit utilized as a feedback event to trigger said switching to said second graphics processing unit.

8. A dual graphics processing system of claim 1 wherein said component for controlling switching participates in a graphics processing unit change over process comprising:
    directing transitioning of a panel to a quiescent state;
    changing driving of display interface signals from said first graphics processing unit to said second graphics processing unit; and
    directing transitioning of said panel to an active state.

9. A dual graphics processing method comprising:
    performing graphics processing on a first graphics processing unit;
    forwarding results of said graphics processing from said first graphics processing unit to a display;
    performing graphics processing on a second graphics processing unit; and
    performing a graphics processing unit change over process in which results of said graphics processing from said second graphics processing unit are forwarded to said display instead of said results of said graphics processing from said first graphics, wherein a backlighting signal is driven by said first graphics processing unit even after a switch to said second graphics processing unit.

10. A dual graphics processing method of claim 9 wherein said first graphics processing unit is an internal graphics processing unit and said second graphics processing unit is a discrete graphics processing unit.

11. A dual graphics processing method of claim 9 wherein said graphics processing unit change over process comprises:
   performing a panel power down sequence;
   changing signals forwarded to said display from a first processing unit to a second processing unit; and
   performing a panel power up sequence.

12. A graphics processing unit change over process of claim 9 wherein said graphics processing unit change over process comprises:
   powering up a first graphics processing unit;
   checking if a second graphics processing unit is powered up;
   powering up a second graphics processing unit if not already powered up; and
   changing information forwarded to said display from said first graphics processing unit to said second graphics processing unit.

13. A non-transitory, tangible computer readable medium with instruction embedded therein for directing a graphics processing unit change over process comprising:
   directing transitioning of a panel to a quiescent state;
   changing driving of display interface signals from a first graphics processor to a second graphics processor; and
   directing transitioning of said panel to an active state and utilizing a panel control signal transmitted from said first graphics processing unit as a feedback event to trigger said changing to the second graphics processor, wherein at least a portion of backlight control is driven by said first graphics processor even after said changing of display interface signals from said first graphics processor to said second graphics processor.

14. A non-transitory, tangible computer readable medium of claim 13 wherein said transitioning to a quiescent state comprises performing a panel power down process.

15. A non-transitory, tangible computer readable medium of claim 13 wherein said transitioning to an active state comprises performing a panel power up process.

16. A non-transitory, tangible computer readable medium of claim 15 wherein said changing signals from a first graphics processor to a second graphics processor comprises loading drivers associated with said second graphics processing unit.

17. A non-transitory, tangible computer readable medium of claim 13 wherein independent panel power sequences are utilized in said transitioning to a quiescent state and said transitioning to said active state.

* * * * *